US009601908B2

(12) United States Patent
Merritt et al.

(10) Patent No.: US 9,601,908 B2
(45) Date of Patent: Mar. 21, 2017

(54) WIRE SUPPORT MEMBER FOR AN ENVIRONMENTAL CONTROL SYSTEM

(71) Applicant: Hamilton Sundstrand Corporation, Windsor Locks, CT (US)

(72) Inventors: Brent J. Merritt, Southwick, MA (US); Kenneth Crawford, Manchester, CT (US); John Perella, Monson, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 122 days.

(21) Appl. No.: 14/619,599

(22) Filed: Feb. 11, 2015

(65) Prior Publication Data

US 2016/0233655 A1 Aug. 11, 2016

(51) Int. Cl.
*H02G 3/02* (2006.01)
*F16C 1/10* (2006.01)
*H01B 7/00* (2006.01)
*H02G 3/04* (2006.01)
*H02G 3/32* (2006.01)
*B64D 13/06* (2006.01)

(52) U.S. Cl.
CPC ............... *H02G 3/02* (2013.01); *F16C 1/102* (2013.01); *F16C 1/103* (2013.01); *F16C 1/105* (2013.01); *H01B 7/0045* (2013.01); *H02G 3/045* (2013.01); *H02G 3/32* (2013.01); *B64D 2013/0603* (2013.01); *B64D 2013/0625* (2013.01)

(58) Field of Classification Search
CPC ........ H01B 7/0045; F16C 1/103; F16C 1/102; F16C 1/105; B64D 2013/0603; B64D 2013/0625; H02G 3/02; H02G 3/045

USPC ................ 248/68.1, 67, 67.7, 200, 65, 300; 138/106, 107, 161; 174/95, 114 R, 115, 174/503
See application file for complete search history.

(56) References Cited

U.S. PATENT DOCUMENTS

| 2,382,970 | A | | 8/1945 | Borcherdt | |
|---|---|---|---|---|---|
| 2,419,761 | A | | 4/1947 | Bruce | |
| 2,447,152 | A | * | 8/1948 | Baker | A47G 29/121 232/35 |
| 3,151,905 | A | | 10/1964 | Reuther et al. | |
| 3,689,193 | A | * | 9/1972 | Riehl | F23Q 9/14 248/300 |
| 3,705,949 | A | | 12/1972 | Weiss | |
| 4,097,012 | A | * | 6/1978 | McIntyre | B60R 11/0205 224/540 |
| 4,234,012 | A | * | 11/1980 | Schupback | E02F 3/384 137/355.17 |

(Continued)

*Primary Examiner* — Eret McNichols
(74) *Attorney, Agent, or Firm* — Kinney & Lange, P.A.

(57) ABSTRACT

A wire support member for an environmental control system includes a bracket having an inner surface, an outer surface, and a thickness. A first arm projects from the bracket, a first flange projects from a first end of the first arm. The first flange includes a first harness support opening therethrough. A second arm also projects from the bracket parallel to the first arm, and a second flange projects from a second end of the second arm. The second flange has a second harness support opening therethrough. A ratio of a diameter of the first harness support opening and of the second harness support opening to the thickness of the bracket optimizes the routing and support for the wiring.

8 Claims, 5 Drawing Sheets

(56) References Cited

U.S. PATENT DOCUMENTS

| | | | |
|---|---|---|---|
| 4,654,967 A | 4/1987 | Thenner | |
| 4,775,286 A * | 10/1988 | Gillette | E02F 3/384 180/420 |
| 5,105,054 A * | 4/1992 | Kirma | H01B 7/0045 174/2 |
| 5,452,871 A | 9/1995 | Sauber | |
| 5,597,980 A | 1/1997 | Weber | |
| 5,598,795 A * | 2/1997 | House | A01C 5/06 111/170 |
| 5,918,837 A | 7/1999 | Vicain | |
| 6,230,585 B1 * | 5/2001 | Bator | F16H 61/0009 137/343 |
| 7,014,152 B2 * | 3/2006 | Grendahl | H02G 3/32 248/49 |
| 7,285,027 B2 | 10/2007 | McGrath et al. | |
| 7,507,906 B2 * | 3/2009 | Suzuki | H02G 3/32 174/117 F |
| 7,905,454 B2 * | 3/2011 | Sanatgar | F16L 3/12 248/300 |
| 8,113,472 B2 * | 2/2012 | Wippler | H05K 5/0204 248/200 |
| 8,668,173 B2 * | 3/2014 | Knobloch | A01C 23/008 248/68.1 |
| 8,876,073 B2 * | 11/2014 | Richey | F16B 12/00 248/200 |
| 8,921,699 B2 | 12/2014 | Al-Ali et al. | |
| 8,979,056 B2 * | 3/2015 | Mayo | B64D 13/02 244/54 |
| 9,236,720 B2 * | 1/2016 | Ichikawa | B60R 16/0215 |
| 9,273,719 B2 * | 3/2016 | Grifka | F16C 1/105 |
| 9,353,890 B2 * | 5/2016 | Dickinson | F16L 3/08 |
| 2005/0217888 A1 | 10/2005 | Arai et al. | |
| 2006/0178246 A1 | 8/2006 | Tjerrild | |
| 2007/0257160 A1 * | 11/2007 | Cushion | H01R 4/027 248/74.1 |
| 2008/0169675 A1 * | 7/2008 | Hebert | F16L 3/1222 296/187.01 |
| 2009/0173844 A1 * | 7/2009 | Huo | H02G 3/32 248/65 |
| 2009/0230243 A1 | 9/2009 | Army et al. | |
| 2010/0032531 A1 * | 2/2010 | Getts | F16L 3/01 248/58 |
| 2012/0091292 A1 * | 4/2012 | Hahn | F16C 1/105 248/73 |
| 2012/0325983 A1 * | 12/2012 | Vrame | F16L 3/22 248/68.1 |
| 2013/0140055 A1 * | 6/2013 | Adachi | H01B 7/0045 174/113 R |
| 2013/0161940 A1 * | 6/2013 | Rossato | B64D 47/00 285/62 |
| 2013/0292159 A1 | 11/2013 | Gotou et al. | |
| 2013/0320155 A1 * | 12/2013 | Okabe | B60K 15/01 248/65 |
| 2013/0323473 A1 * | 12/2013 | Dietsch | B29C 67/0055 428/174 |
| 2013/0344790 A1 | 12/2013 | Army et al. | |
| 2014/0158454 A1 * | 6/2014 | Kikuta | B21D 53/88 180/443 |
| 2014/0306071 A1 * | 10/2014 | Stechmann | H02G 3/32 248/74.1 |
| 2014/0326836 A1 * | 11/2014 | Kim | F16C 1/105 248/65 |
| 2014/0332639 A1 * | 11/2014 | Ahlem | A01J 7/00 248/68.1 |
| 2016/0066473 A1 * | 3/2016 | Tsuboi | B60R 16/0215 361/699 |
| 2016/0161052 A1 * | 6/2016 | Griggs | F16M 11/24 320/108 |

* cited by examiner

WIRE SUPPORT MEMBER FOR AN ENVIRONMENTAL CONTROL SYSTEM

BACKGROUND

The present disclosure relates to aircraft environmental control systems (ECS), and more specifically to mounting systems for components of an ECS. An ECS utilizes cabin air compressors to condition air for delivery to an aircraft cabin. The pressure and temperature of the aircraft cabin must be maintained throughout a wide variety of flight conditions. A pack control unit (PCU) communicates with and receives feedback from cabin air compressor modules to ensure that the temperature and pressure of the aircraft cabin remains at sufficient levels. The PCU communicates with the cabin air compressor modules through wiring that is routed from the PCU to each module. The wiring must be routed and supported such that the wiring will not interfere with other parts of the ECS and will not wear through.

SUMMARY

According to an embodiment of the present invention, a wire support member for an environmental control system includes a bracket having an inner surface, an outer surface, and a thickness T1, a first arm projecting from the bracket, a first flange projecting from a first end of the first arm, the first flange having a first harness support opening therethrough, the first harness support opening having a diameter D1, a second arm projecting from the bracket and oriented in a plane with the first arm, and a second flange projecting from a second end of the second arm, the second flange having a second harness support opening therethrough, the second harness support opening having a diameter D2.

According to another embodiment of the present invention, a wire support assembly for an environmental control system includes a wiring for the environmental control system having a first wire bundle extending from a pack control unit and branching into a second wire bundle and a third wire bundle, the second wire bundle extending from the first wire bundle to an outboard module, and the third wire bundle extending from the first wire bundle to an inboard module, a first wire support member mounted to a first backbone support structure, the first wire support member supporting the first wire bundle, the second wire bundle, and the third wire bundle, the first wire support member including a bracket having an inner surface, an outer surface, and a thickness T1, a first arm projecting from the bracket, a first flange projecting from a first free end of the first arm, the first flange having a first harness support opening therethrough, the first harness support opening having a diameter D1, a second arm projecting from the bracket and oriented in a plane with the first arm, and a second flange projecting from a second end of the second arm, the second flange having a second harness support opening therethrough, the second harness support opening having a diameter D2, a second wire support member mounted to an outboard support structure of the outboard module, the second wire support member supporting the second wire bundle between the first wire support member and the outboard module, and a third wire support member mounted to a first compressor casing of the inboard module, the third wire support member supporting the third wire bundle between the first wire support member and the inboard module.

DETAILED DESCRIPTION

Figure 1:
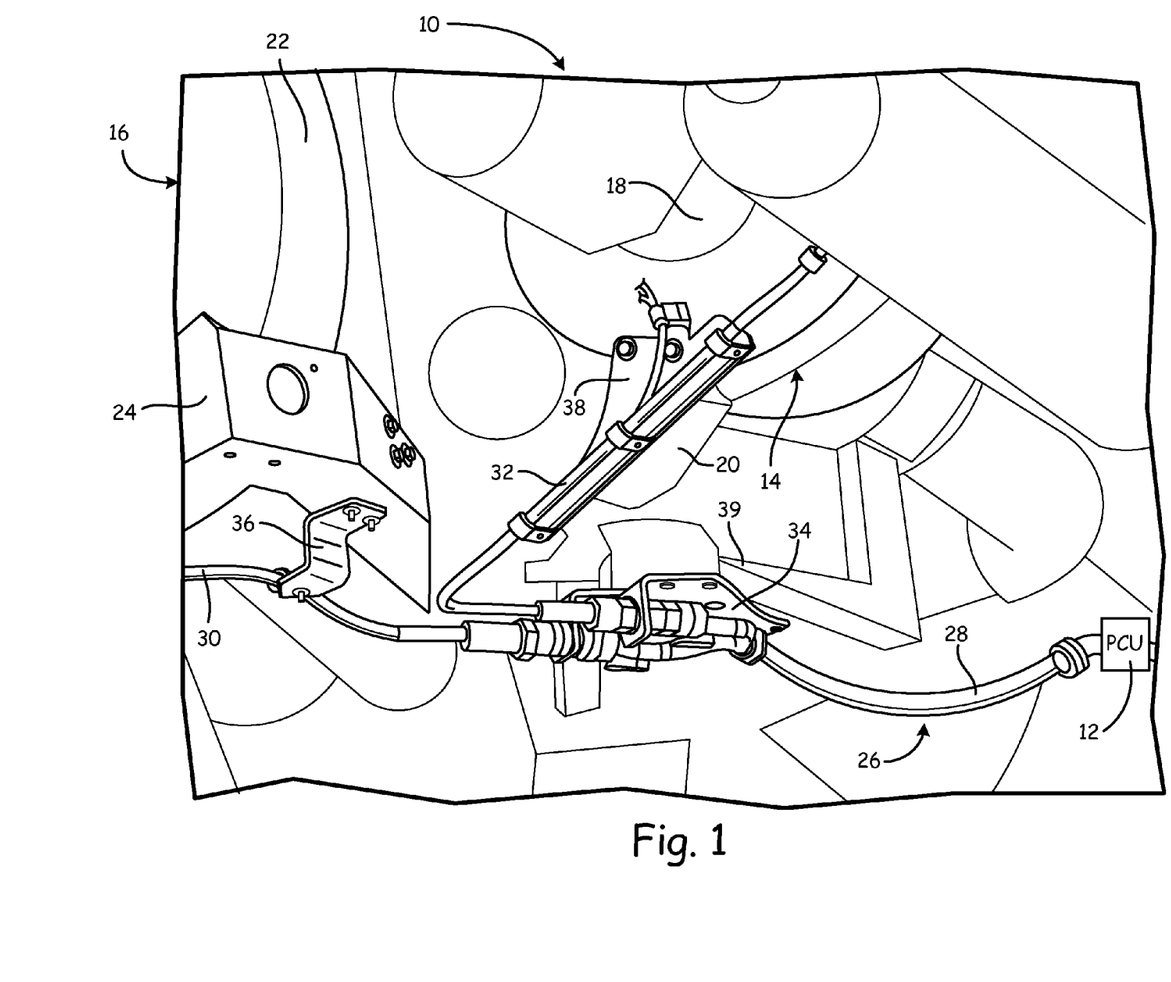
FIG. 1 is a perspective view of a wire harness support system for an aircraft environmental control system.

FIG. 1 is a perspective view of a wire harness support system for an aircraft environmental control system (ECS) 10. ECS 10 includes pack control unit 12 (PCU), inboard module 14, and outboard module 16. Inboard module 14 includes inboard cabin air compressor 18 and module support structure 20. Outboard module 16 includes outboard cabin air compressor 22 and module support structure 24. ECS 10 also includes wiring 26 extending from PCU 12 to inboard module 14 and outboard module 16. Wiring 26 includes first wire harness 28, second wire harness 30, and third wire harness 32. Wiring 26 is supported by first wire support member 34, second wire support member 36, and third wire support member 38. ECS 10 further includes backbone support structure 39 for supporting ECS 10 and various other modules of ECS 10.

First wire harness 28 is connected to PCU and supported by first wire support member 34. First wire harness 28 splits to form second wire harness 30 and third wire harness 32. Both second wire harness 30 and third wire harness 32 are supported by first wire support member 34. Second wire harness 30 is connected to, and extends from, first wire harness 28, and second wire harness 30 is also connected to outboard module 16. As second wire harness 30 proceeds from first wire support member 34 to outboard module 16, second wire harness 30 is supported by second wire support member 36. First wire support member 34 is mounted to backbone support structure 39 and optimizes the routing of first wire harness 28, second wire harness 30, and third wire harness 32. Second wire support member 36 is mounted to module support structure 24 and optimizes the routing of second wire harness 30. Third wire support member 38 is mounted to a housing of inboard module 14 and optimizes the routing of third wire harness 32.

Similar to second wire harness 30, third wire harness 32 is connected to and extends from first wire harness 28. Third wire harness 32 extends from first wire harness 28 to inboard module 14. Third wire harness 32 is supported by third wire support member 38 as third wire harness 32 proceeds from first wire support member 34 to inboard module 14. As third wire harness 32 proceeds along third wire support member 38, third wire harness 32 splits to include a main bundle and a secondary bundle. Both the main bundle and the secondary bundle are supported by and routed by third wire support member 38.

First wire support member 34 is mounted to a backbone support structure 39. Fasteners extend through fastener openings (best seen in FIG. 2) of first wire support member 34 and into the backbone support structure 39 to secure first wire support member 34. First wire support member 34 supports first wire harness 28. First wire support member 34 also supports second wire harness 30 and third wire harness 32 after second wire harness 30 and third wire harness 32 split from first wire harness 28. First wire support member 34 optimizes the routing of first wire harness 28 to PCU 12. First wire support member 34 also optimizes the routing of second wire harness 30 from first wire harness 28 to second wire support member 36, and of third wire harness 32 from first wire harness 28 to third wire support member 38, which prevents second wire harness 30 and third wire harness 32 from becoming entangled. Optimizing the routing of first wire harness 28, second wire harness 30, and third wire harness 32 also prevents inadvertent contact with various components of ECS 10 that may have an effect on the operation of the wire harnesses.

Figure 2:
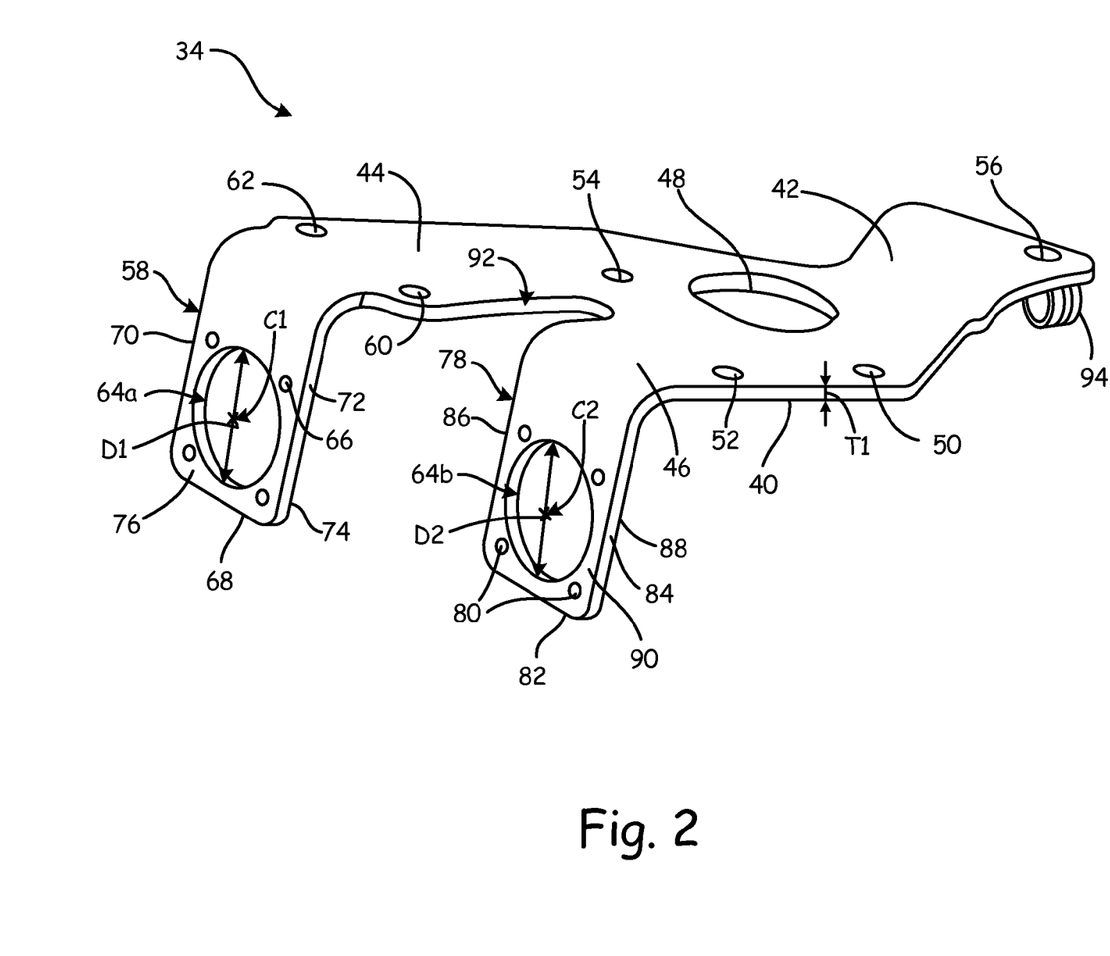
FIG. 2 is a perspective view of a wire support member.

FIG. 2 is a perspective view of first wire support member 34. First wire support member 34 includes inner surface 40, outer surface 42, thickness T1, first arm 44, and second arm 46. First wire support member 34 further includes aperture 48, first fastener opening 50, second fastener opening 52, third fastener opening 54 and fourth fastener opening 56. First arm 44 includes first flange 58 projecting from a first end of first arm 44. First arm 44 further includes fifth fastener opening 60 and sixth fastener opening 62. First flange 58 includes wire harness support 64a, fastener openings 66, first free end 68, first outer edge 70, first inner edge 72, first flange inner surface 74, and first flange outer surface 76. Wire harness support 64a includes diameter D1 and center C1. Second arm 46 includes second flange 78 projecting from a first end of second arm 46. Second flange 78 includes wire harness support 64b, fastener openings 80, second free end 82, second outer edge 84, second inner edge 86, second flange inner surface 88, and second flange outer surface 90. Wire harness support 64b includes diameter D2 and center C2. Notch 92 is formed between first arm 44 and second arm 46. First wire support member 34 also includes clamp 94 projecting from inner surface 40 at an end of first wire support member 34 opposite first arm 44 and second arm 46.

First wire harness 28 proceeds from PCU 12 to first wire support member 34. First wire support member 34 supports first wire harness 28 and routs first wire harness 28 to ensure that first wire harness 28 does not experience excessive wear due to contact with various components of ECS 10. After first wire harness 28 is secured by first wire support member 34, first wire harness 28 splits to form second wire harness 30 and third wire harness 32. Second wire harness 30 passes through and is supported by wire harness support 64a between first wire harness 28 and second wire support member 36 (best seen in FIG. 1). Similarly, third wire harness 32 passes through and is supported by wire harness support 64b between first wire harness 28 and third wire support member 38 (best seen in FIG. 1).

First wire support member 34 is secured to backbone support structure 39 by fasteners extending through first fastener opening 50, second fastener opening 52, third fastener opening 54, fifth fastener opening 60, and sixth fastener opening 62. First arm 44 and wire harness support 64a guide second wire harness 30 and prevent second wire harness 30 from becoming entangled with third wire harness 32 between first wire harness 28 and third wire support member 38. Similarly, second arm 46 and wire harness support 64b guide third wire harness 32 and prevent third wire harness 32 from becoming entangled with second wire harness 30 between first wire harness 28 and second wire support member 36.

First wire support member 34 is made from a lightweight material to reduce the weight impact on the aircraft caused by first wire support member 34, the lightweight material being sufficiently rigid to support the wiring throughout the flight envelope of the aircraft. First wire support member 34 may be coated or uncoated. In the present embodiment, first wire support member 34 is made from aluminum or an aluminum alloy. It is understood, however, that first wire support member 34 may be made of any suitable material for supporting and routing the wiring throughout the flight envelope of the aircraft without having a significant weight impact on the aircraft, such as titanium, titanium alloys, or carbon fiber.

Clamp 94 is secured to inner surface 42 by a fastener extending through fourth fastener opening 56 and engaging clamp 94. While first wire support member 34 is described as including clamp 94, it is understood that any suitable retaining mechanism for routing and retaining first wire harness 28 may be utilized. Clamp 94 may also include a cushion, such as a cushion made from an elastomer material, disposed between clamp 94 and first wire bundle 28 to prevent clamp 94 from having an effect on the operation of first wire harness 28.

Aperture 48 through first wire support member 34 reduces the weight of first wire support member 34. While aperture 48 is shown as an egg-shaped opening, it is understood that aperture 48 may take any suitable shape for enhancing the weight reduction of first wire support member 34 without reducing the structural integrity of first wire support member 34. For example, aperture 48 may be circular, square, polygonal, or may take any other suitable shape.

Figure 3A:
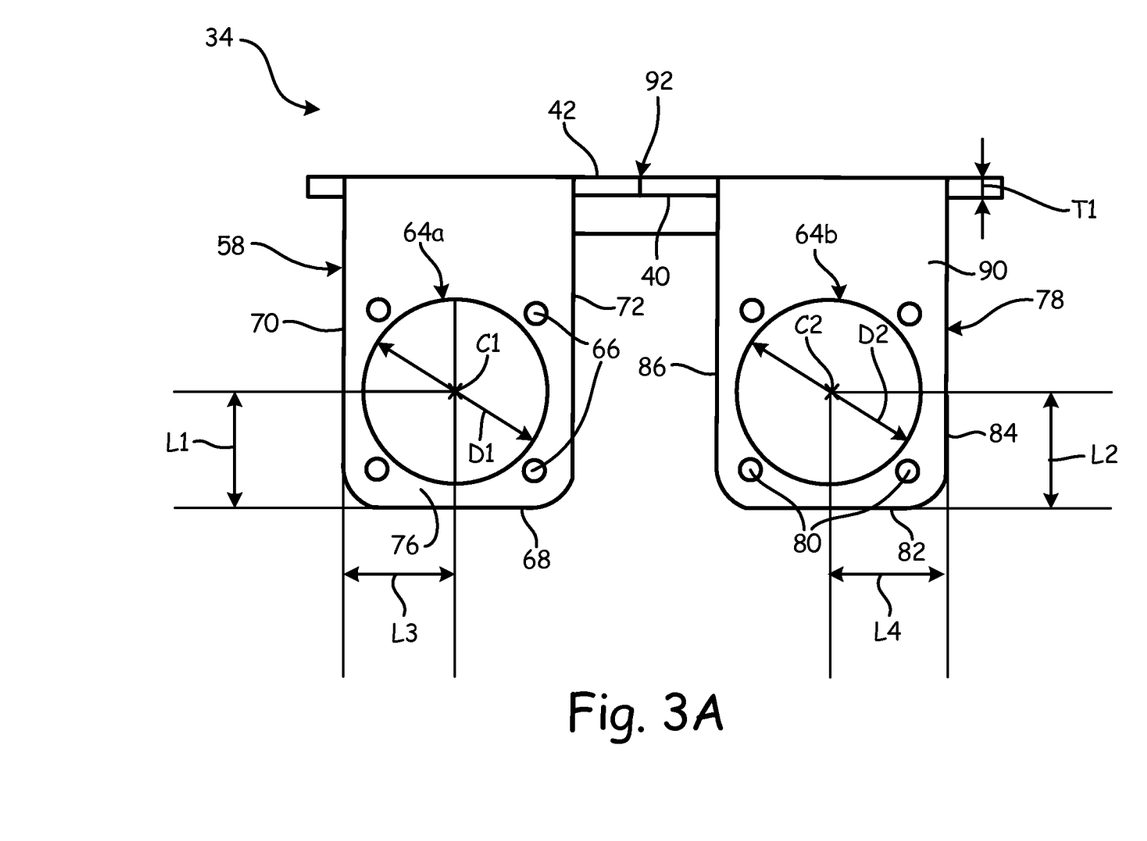
FIG. 3A is a front elevation view of a wire support member.
Figure 3B:
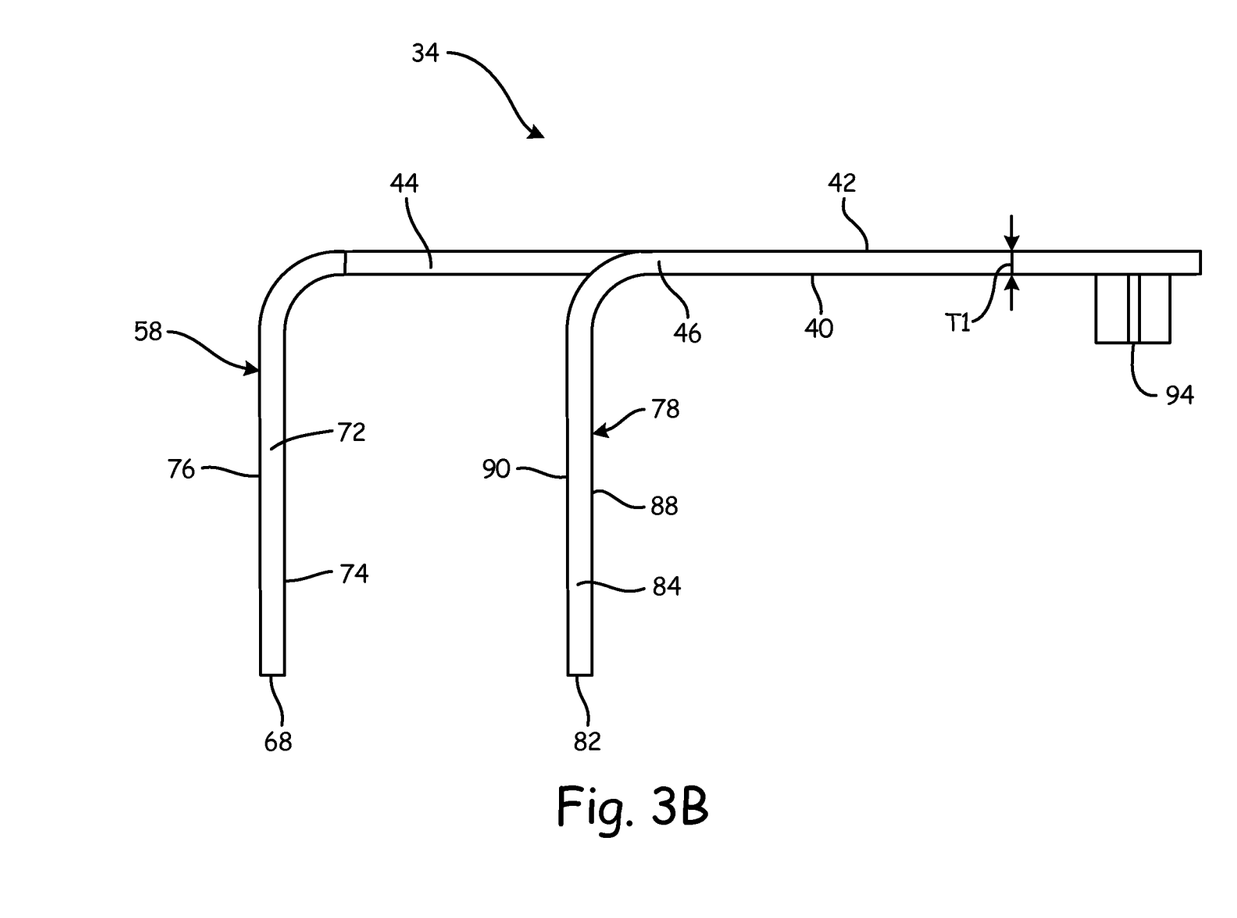
FIG. 3B is a side elevation view of a wire support member.
Figure 3C:
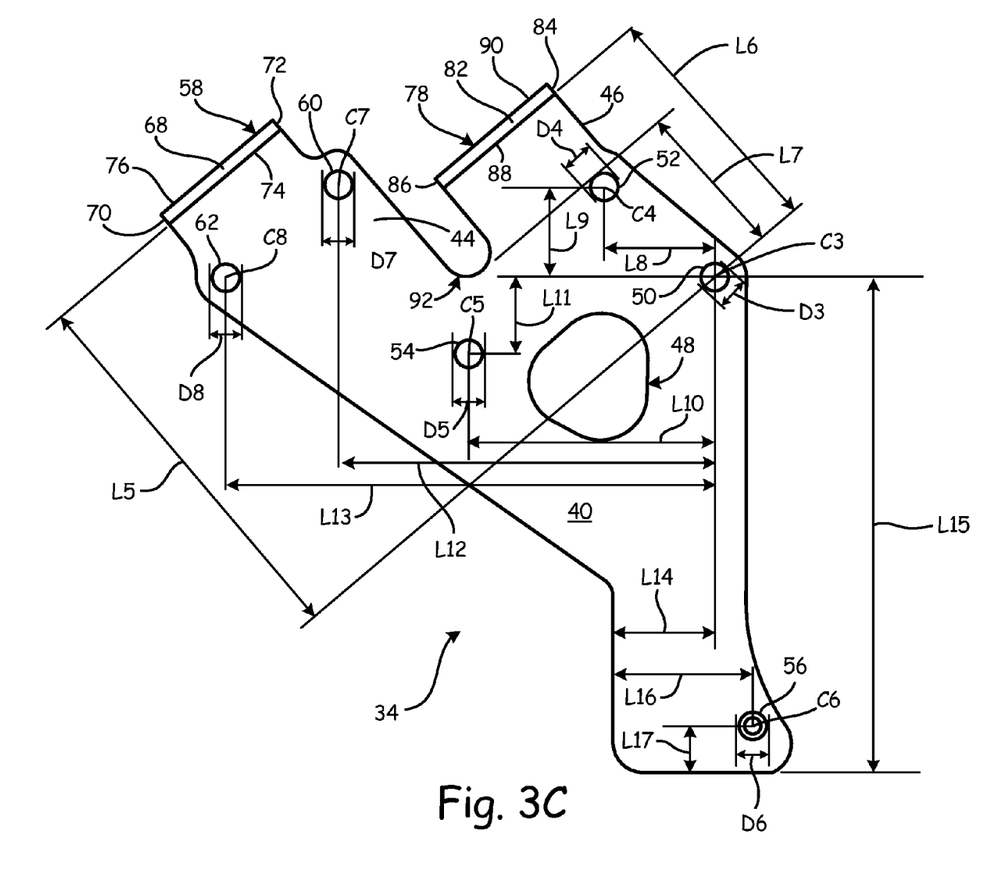
FIG. 3C is a bottom plan view of a wire support member.

FIG. 3A is a front elevation view of first wire support member 34. FIG. 3B is a side elevation view of first wire support member 34. FIG. 3C is a bottom plan view of first wire support member 34. FIGS. 3A-3C will be discussed together. First wire support member 34 includes inner surface 40, outer surface 42, thickness T1, first arm 44, and second arm 46. First wire support member 34 further includes aperture 48, first fastener opening 50, second fastener opening 52, third fastener opening 54 and fourth fastener opening 56. First arm 44 includes first flange 58 projecting from a first end of first arm 44. First arm 44 further includes fifth fastener opening 60 and sixth fastener opening 62. First flange 58 includes wire harness support 64a, fastener openings 66, first free end 68, first outer edge 70, first inner edge 72, first flange inner surface 74, and first flange outer surface 76. Second arm 46 includes second flange 78 projecting from a first end of second arm 46. Second flange 78 includes wire harness support 64b, fastener openings 80, second free end 82, second outer edge 84, second inner edge 86, second flange inner surface 88, and second flange outer surface 90. Notch 92 is formed between first arm 44 and second arm 46. First wire support member 34 also includes clamp 94 projecting from inner surface 40 at an end of first wire support member 34 opposite first arm 44 and second arm 46.

Wire harness support 64a includes diameter D1 and center C1. Wire harness support 64b includes diameter D2 and center C2. First fastener opening 50 has diameter D3 and center C3. Second fastener opening 52 has diameter D4 and center C4. Third fastener opening 54 has diameter D5 and center C5. Fourth fastener opening 56 has diameter D6 and center C6. Fifth fastener opening 60 has diameter D7 and center C7. Sixth fastener opening 62 has diameter D8 and center C8.

T1 is between 0.119 inches (0.302 centimeters) and 0.131 inches (0.333 centimeters). D1 is between 1.209 inches (3.070 centimeters) and 1.229 inches (3.122 centimeters). D2 is between 1.209 inches (3.070 centimeters) and 1.229 inches (3.122 centimeters). A ratio of D1 to T1 is between 9.00 and 10.50. Similarly, a ratio of D2 to T1 is between 9.00 and 10.50.

Referring specifically to FIG. 3A, length L1 is a distance between first free end 68 and center C1. Similarly, length L2 is a distance between second free end 82 and center C2.

Length L3 is a distance between first outer edge 70 and center C1. Length L4 is a distance between second outer edge 84 and center C2.

Referring specifically to FIG. 3C, Length L6 is a distance between center C3 and second flange inner surface 86. L7 is a distance between center C3 and an apex of notch 92. Second fastener opening 52, third fastener opening 54, fifth fastener opening 60, and sixth fastener opening 62 may be located with reference to first fastener opening 50. Length L5 is a distance between center C3 and first flange inner surface 74. Length L8 is a horizontal distance between C3 and C4, and length L9 is a vertical distance between C3 and C4. Thus, second fastener opening 52 is horizontally displaced length L6 from first fastener opening 50 and is vertically displaced length L9 from first fastener opening 50. Length L10 is a horizontal distance between C3 and C5, and length L11 is a vertical distance between C3 and C5. Length L12 is a horizontal distance between C3 and C7, and length L9 is a vertical distance from C3 to C7. As length L9 is the vertical distance from center C3 to center C7 and from center C3 to center C4 in the present embodiment, both second fastener opening 52 and fifth fastener opening 60 are located on the same vertical plane. Length L13 is a horizontal distance from center C3 and center C8. In the present embodiment first fastener opening 50 and sixth fastener opening 62 lie in the same plane.

Similarly length L14 is a distance between center C3 and a vertical edge of first wire support member 34. Length L15 is a distance between center C3 and a horizontal edge of first wire support member 34. Length L16 is a distance between center C6 and the vertical edge of first wire support member 34, and length L17 is a distance between center C6 and the horizontal edge of first wire support member 34.

In the present embodiment, length L1 is about 0.750 inches (1.905 centimeters). Length L2 is also about 0.750 inches (1.905 centimeters). Length L3 is about 0.750 inches (1.905 centimeters). Length L4 is also about 0.750 inches (1.905 centimeters). Length L5 is about 4.030 inches (10.236 centimeters). Length L6 is about 2.505 inches (6.363 centimeters). Length L7 is about 1.588 inches (4.034 centimeters). Length L8 is about 1.150 inches (2.921 centimeters). Length L9 is about 0.960 inches (2.438 centimeters). Length L10 is about 2.510 inches (6.375 centimeters). Length L11 is about 0.800 inches (2.032 centimeters). Length L12 is about 3.870 inches (9.830 centimeters). Length L13 is about 5.020 inches (12.751 centimeters). Length L14 is about 1.025 inches (2.604 centimeters). Length L15 is about 5.140 inches (13.056 centimeters). Length L16 is about 1.450 inches (3.683 centimeters). Length L17 is about 0.500 inches (1.270 centimeters). While lengths have been described, it is understood that the lengths may vary within acceptable engineering tolerances, plus or minus 0.060 inches (0.152 centimeters) for example. Additionally, it is to be understood that the relationships between the various lengths are within the scope of the present invention. For example, first wire support member 34 may be scaled to twice the preferred size and a ratio of L8 to L9 would remain at about 1.2.

The ratio of diameter D1 to thickness T1, and the ratio of diameter D2 to thickness T1 ensure that first wire support member 34 has adequate structural integrity to support first wire harness 28, second wire harness 30, and third wire harness 32. The ratios are also configured such that first wire support member 34 routes second wire harness 30 to second wire support member 36 and third wire harness 32 to third wire support member 38 in such a way that both second wire harness 30 and third wire harness 32 do not become entangled and avoid various components of ECS 10 that may have an adverse effect on either second wire harness 30 or third wire harness 32. Similarly, the ratio of diameter D1 or D2 to thickness T1 ensures adequate routing and support for first wire harness 28 to PCU 12. Furthermore, while first wire support member 34 has sufficient structural integrity, the ratios also ensure that first wire support member 34 is sufficiently lightweight that first wire support member 34 does not have an adverse weight impact on the aircraft.

First wire support member 34 is mounted to backbone support structure 39 (shown in FIG. 1). Backbone support structure 39 locates first wire support structure 34 near a centerline of the ECS 10. This location reduces the amount of strain imparted on first wire support member 34 by wiring 26 by reducing the total length of wiring 26 needed to allow PCU 12 to communicate with inboard module 14 and outboard module 16. This also allows first wire support member 34 to remain lightweight as first wire support member 34 does not have to carry as heavy of a load.

First wire support member 34 must be able to support the weight of first wire harness 28, second wire harness 30, and third wire harness 32 throughout the envelope of flight conditions experienced by the aircraft. First wire support member 28 must also maintain the routing of first wire harness 28 to ensure that constant communication from and to PCU 12 is maintained. First wire support member 36 retains first wire harness 28 in a floating position away from other components of environmental control system 10 to prevent first wire harness 28 from rubbing against or interfering with the other components of environmental control system 10. Additionally, first wire support member 28 must maintain the routing of second wire harness 30 between first wire harness 28 and second wire support member 36 and of third wire harness 32 between first wire harness 28 and third wire support member 38 in such a way that second wire harness 32 and third wire harness 34 do not interfere with each other. The ratio of thickness T1 to diameter D1 and to diameter D2 ensures that first wire harness 28, second wire harness 30, and third wire harness 32 are maintained in positions that ensure the integrity of the wiring system. The ratio of thickness T1 to diameter D1 and diameter D2 also ensures that first wire support member 34 is sufficiently lightweight and compact, while also maintaining sufficient structural integrity to allow first wire support member 34 to support first wire harness 28, second wire harness 30, and third wire harness 32.

Discussion of Possible Embodiments

The following are non-exclusive descriptions of possible embodiments of the present invention.

A wire support member for an environmental control system, the wire support member including a bracket having an inner surface, an outer surface, and a thickness T1, a first arm projecting from the bracket, a first flange projecting from a first end of the first arm, the first flange having a first harness support opening therethrough, the first harness support opening having a diameter D1, a second arm projecting from the bracket and oriented in a plane with the first arm, and a second flange projecting from a second end of the second arm, the second flange having a second harness support opening therethrough, the second harness support opening having a diameter D2.

The wire support member of the preceding paragraph can optionally include, additionally and/or alternatively, any one or more of the following features, configurations and/or additional components:

A further embodiment of the foregoing wire support member, wherein a ratio of D1 to T1 is between 9.0 and 10.5.

A further embodiment of any of the foregoing wire support members, wherein a ratio of D2 to T1 is between 9.0 and 10.5.

A further embodiment of any of the foregoing wire support members, wherein T1 is between 0.119 inches (0.302 centimeters) and 0.131 inches (0.333 centimeters).

A further embodiment of any of the foregoing wire support members, wherein a length of the first arm is greater than a length of the second arm.

A further embodiment of any of the foregoing wire support members, wherein D1 is between 1.209 inches (3.070 centimeters) and 1.229 inches (3.122 centimeters) and D2 is between 1.209 inches (3.070 centimeters) and 1.229 inches (3.122 centimeters).

A further embodiment of any of the foregoing wire support members, wherein a weight reduction aperture extends through the bracket from the inner surface to the outer surface.

A wire support assembly for an environmental control system, the wire support assembly including a wiring for the environmental control system including a first wire bundle extending from a pack control unit and branching into a second wire bundle and a third wire bundle, the second wire bundle extending from the first wire bundle to an outboard module, and the third wire bundle extending from the first wire bundle to an inboard module, a first wire support member mounted to a first backbone support structure, the first wire support member supporting the first wire bundle, the second wire bundle, and the third wire bundle, the first wire support member including a bracket having an inner surface, an outer surface, and a thickness T1, a first arm projecting from the bracket, a first flange projecting from a first free end of the first arm, the first flange having a first harness support opening therethrough, the first harness support opening having a diameter D1, a second arm projecting from the bracket and oriented in a plane with the first arm, and a second flange projecting from a second end of the second arm, the second flange having a second harness support opening therethrough, the second harness support opening having a diameter D2, a second wire support member mounted to an outboard support structure of the outboard module, the second wire support member supporting the second wire bundle between the first wire support member and the outboard module, and a third wire support member mounted to a first compressor casing of the inboard module, the third wire support member supporting the third wire bundle between the first wire support member and the inboard module.

The wire support assembly of the preceding paragraph can optionally include, additionally and/or alternatively, any one or more of the following features, configurations and/or additional components:

A further embodiment of the foregoing wire support assembly, wherein a ratio of D1 to T1 is between 9.0 and 10.5.

A further embodiment of any of the foregoing wire support assemblies, wherein a ratio of D2 to T1 is between 9.0 and 10.5.

A further embodiment of any of the foregoing wire support assemblies, wherein T1 is between 0.119 inches (0.302 centimeters) and 0.131 inches (0.333 centimeters).

A further embodiment of any of the foregoing wire support assemblies, wherein a length of the first arm is greater than a length of the second arm.

A further embodiment of any of the foregoing wire support assemblies, wherein D1 is between 1.209 inches (3.070 centimeters) and 1.229 inches (3.122 centimeters) and D2 is between 1.209 inches (3.070 centimeters) and 1.229 inches (3.122 centimeters).

A further embodiment of any of the foregoing wire support assemblies, wherein a clamp is mounted to the inner surface of the bracket and the first wire harness is supported by the clamp.

A further embodiment of any of the foregoing wire support assemblies, wherein the clamp includes an elastomer cushion secured between the clamp and the second wire bundle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wire support assembly for an environmental control system, the wire support assembly comprising:
   a wiring for the environmental control system comprising:
      a first wire bundle extending from a pack control unit and branching into a second wire bundle and a third wire bundle;
      the second wire bundle extending from the first wire bundle to an outboard module; and
      the third wire bundle extending from the first wire bundle to an inboard module;
   a first wire support member mounted to a first backbone support structure, the first wire support member supporting the first wire bundle, the second wire bundle, and the third wire bundle, the first wire support member comprising:
      a bracket having an inner surface, an outer surface, and a thickness T1;
      a first arm projecting from the bracket;
      a first flange projecting from a first free end of the first arm, the first flange having a first harness support opening therethrough, the first harness support opening having a diameter D1;
      a second arm projecting from the bracket and oriented in a plane with the first arm; and
      a second flange projecting from a second end of the second arm, the second flange having a second harness support opening therethrough, the second harness support opening having a diameter D2;
   a second wire support member mounted to an outboard support structure of the outboard module, the second wire support member supporting the second wire bundle between the first wire support member and the outboard module; and
   a third wire support member mounted to a first compressor casing of the inboard module, the third wire support member supporting the third wire bundle between the first wire support member and the inboard module.

2. The wire support structure of claim 1, wherein a ratio of D1 to T1 is between 10.5 and 9.0.

3. The wire support structure of claim 1, wherein a ratio of D2 to T1 is between 10.5 and 9.0.

4. The wire support structure of claim 1, wherein T1 is between 0.119 inches (0.302 centimeters) and 0.131 inches (0.333 centimeters).

5. The wire support structure of claim 1, wherein a length of the first arm is greater than a length of the second arm.

6. The wire support structure of claim 1, wherein D1 is between 1.209 inches (3.070 centimeters) and 1.229 inches (3.122 centimeters) and D2 is between 1.209 inches (3.070 centimeters) and 1.229 inches (3.122 centimeters).

7. The wire support structure of claim 1, further comprising:
   a clamp mounted to the inner surface of the bracket, the first wire harness supported by the clamp.

8. The wire support structure of claim 7, wherein the clamp includes an elastomer cushion secured between the clamp and the second wire bundle.

\* \* \* \* \*